United States Patent [19]

McClain et al.

[11] 4,025,834

[45] May 24, 1977

[54] NEGATIVE SEQUENCE COMPENSATION FOR POLYPHASE EQUIPMENT

[75] Inventors: James E. McClain; Howard L. Scott, both of Greenville, Tex.

[73] Assignee: Esco Manufacturing Company, Greenville, Tex.

[22] Filed: May 22, 1975

[21] Appl. No.: 579,893

[52] U.S. Cl. .............................. 318/228; 318/509; 318/513; 361/113; 323/83; 361/31; 323/7
[51] Int. Cl.² ......................................... H02P 7/40
[58] Field of Search .......... 318/228, 229, 509, 512, 318/513; 317/13 R, 47, 53; 323/6, 7, 83

[56] References Cited

UNITED STATES PATENTS

| 1,186,804 | 6/1916 | Lamme | 318/228 |
|---|---|---|---|
| 2,066,932 | 1/1937 | Evans | 317/47 |
| 2,876,412 | 3/1959 | Artzt | 318/228 X |
| 3,054,944 | 9/1962 | Brooke et al. | 318/513 X |
| 3,855,412 | 12/1974 | Maddux | 323/6 X |

*Primary Examiner*—Gene Z. Rubinson
*Attorney, Agent, or Firm*—Kenneth R. Glaser

[57] ABSTRACT

Negative sequence compensation apparatus for reducing, and thereafter minimizing the increase of, negative sequence currents flowing in a three phase motor includes variable impedance elements, and means for adjusting the impedance thereof, disposed in the motor supply lines. Alternate embodiments disclose saturable reactors as the variable impedance elements electrically connected with the supply terminals by way of alternate transformer connections.

5 Claims, 5 Drawing Figures

NEGATIVE SEQUENCE COMPENSATION FOR POLYPHASE EQUIPMENT

The present invention relates to protection of polyphase equipment, more particularly to a method and apparatus for providing negative sequence compensation for three phase motors, and even more particularly to a variable impedance negative sequence compensation network for induction motors.

Electrical rotating machinery, such as polyphase generators and motors, are desirably operated under symmetrical circuit conditions, i.e., balanced voltages and phase relationships. In reality, however, circuit conditions often exist which exist in dissymmetries in these polyphase systems. For example, in the case of a-c motors, such as the conventional three phase induction motor, line faults or fluctuations result in unbalanced voltages being supplied to the motor. Additionally, unequal windings and unequal impedances in the motor itself result in nonsymmetrical circuit conditions.

It has been early and firmly established that the result and effect of circuit dissymmetry or voltage imbalance between phases of apolyphase system is the generation of voltage and current components, referred to as negative sequence components, which have a phase sequence opposite to that of the line voltages. Unfortunately, these negative sequence components have a deleterious effect on the operation of the motor. For example, the negative sequence current which flows in the induction motor produces a magnetic field which revolves in a direction opposite the direction of rotation of the rotor, thus producing a reverse or counteracting torque. Additionally, and most significantly, the negative sequence currents result in excessive heating of the polyphase induction motor, it actually being determined that the negative sequence currents produce more heat per ampere than the heat resulting from positive sequence currents. Furthermore, the negative seqence components resulting from the unbalanced system cause vibration which not only increases noise, but is potentially injurious to the motor bearings, insulation, and interconnected mechanical equipment. Thus, the presence of negative sequence components not only reduces the operating efficiency of the motor, but results in equipment failure and consequent costly production delays.

As a consequence of the aforementioned difficulties, efforts have been directed to the design and development of protective networks and relays effective to sense the unbalanced conditions in order to interrupt the motor operation until correction of the conditions. To date, however, effective compensation for these negative sequence components during motor operation, as opposed to motor interruption, has not been achieved.

It is therefore a principal object of the present invention to provide negative sequence current compensation in polyphase systems.

It is another object of the present invention to provide a new and improved method and apparatus for minimizing negative sequence currents in polyphase equipment as a consequence of unbalanced voltage and phase relationships which may be encountered during operation of the equipment.

It is a still further object of the invention to provide new and improved compensation networks for incorporation with a three phase induction motor to initially null, and thereafter maintain at a minimum, negative sequence currents in the motor.

In accordance with these and other objects, the present invention contemplates the provision of compensation means in the supply lines to, and immediately adjacent, the a-c load (induction motor, for example) which is effective to vary the overall impedance of the system to null, as well as limit the increase of, negative sequence currents flowing in the load. Specifically, the negative sequence compensation network is adjusted to initially null the existing negative sequence currents in the motor, the so-adjusted network thereafter being effective to maintain the negative sequence currents at such nulled value, or at least to small and therefore acceptable increases therefrom, for imbalances normally encountered during motor operation. The compensation network, inductively and electrically coupled with the inputs to the motor, provides a closed loop system with the motor and thereby eliminates, or constrains the increase of, negative sequence currents which would normally occur without such compensation. Additional features, objects, and advantages of the present invention can be more readily ascertained and understood by the following detailed description taken in conjunction with the accompanying drawings, wherein:

Figure 1:
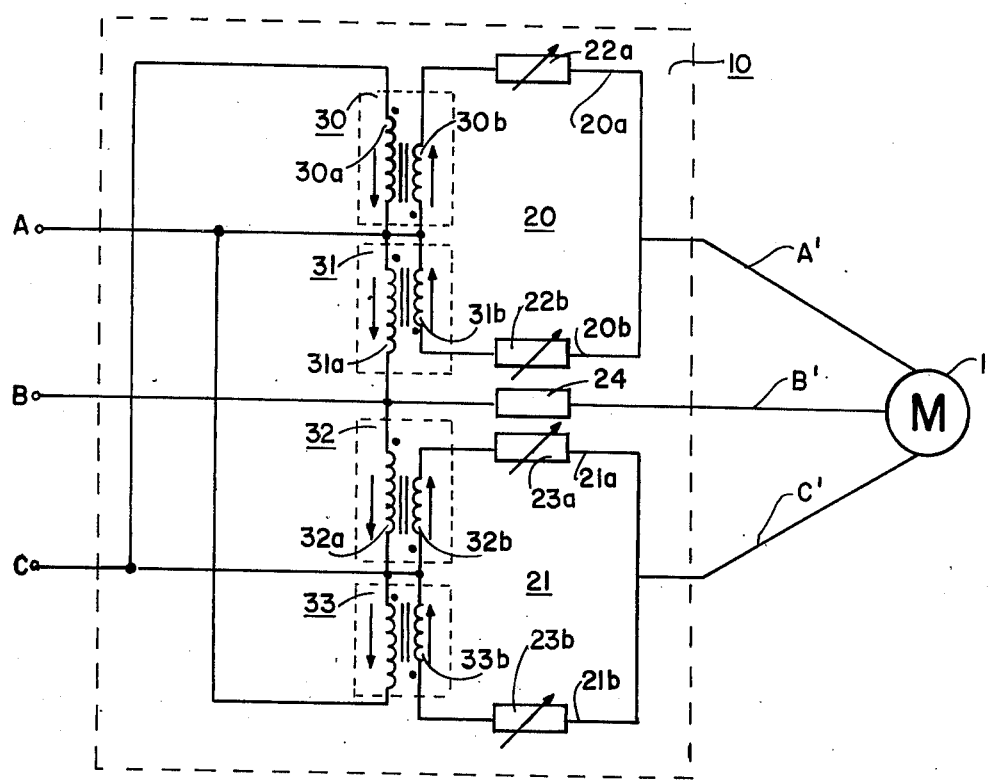
FIG. 1 is a schematic drawing, partially in block diagram form, illustrating the negative sequence compensation network in accordance with one preferred embodiment of the invention, and showing its interconnection with a polyphase motor.

Referring initially to FIG. 1, a conventional three phase induction motor 1 having input leads A', B', and C' receives power from a three phase electrical distribution system (not shown), the resulting supply voltages appearing across the respective input terminals A, B, and C. The respective line to line input voltages (A-B, B-C, C-A) may be derived from either a wye or delta connected source; although the present invention has particular advantages in the case of the former.

Under idealized conditions, the supply voltages across the input terminals A, B, and C would be equal in magnitude and phase displaced from one another by 120°; and the motor (and leads) would constitute a perfectly balanced load. In actuality, however, fluctuations in the electrical distribution system and/or unequal impedances in the respective supply lines result in unbalanced voltage conditions at the input terminals A, B, and C. Additionally, variations in the windings, unequal impedances, etc. in the motor itself further produce unbalanced or unsymmetrical circuit conditions, thus resulting in the generation of the negative sequence currents and the resultant harmful effect on the motor operation. Consequently, and in accordance with the broad concept of the present invention, a negative sequence compensation network 10 effective to eliminate, or minimize the increase of, these negative sequence components during motor operation is connected adjacent the motor 1 between the input terminals A, B, and C and the motor leads A', B', and C'; and details and operation of preferred embodiments of such network subsequently being described.

Accordingly, and still referring to FIG. 1, a first preferred embodiment of the compensation network 10 comprises a first closed loop 20 (having parallel branches 20a and 20b) interconnected between one of the input terminals (for example A) and the corresponding motor lead (A') and a second closed loop 21 (having parallel branches 21a and 21b) interconnected between another input terminal (for example C) and its corresponding motor lead (C').

Connected in each branch of the loops 20 and 21 is an impedance means (22a, 22b, 23a, and 23b), the means 22a, 22b, 23a, and 23b being variable impedance elements. Additionally, another impedance element 24 may, if desired, be connected between the remaining input terminal (B) and its corresponding motor lead (B').

Four transformers 30–33 have their respective primary windings connected across the input terminals with the corresponding secondary windings electrically connected thereto as well as in the respective parallel branches of loops 20 and 21. Thus, as depicted in the drawings, transformer 30 has its primary winding 30a connected across input terminals C and A, with secondary winding 30b connected intermediate terminal A and impedance means 22a; and transformer 31 has primary winding 31a connected across terminals A and B with secondary winding 31b connected intermediate terminal A and impedance means 22b. Similary, primary winding 32a of transformer 32 is connected from B to C with the secondary winding 32b connected intermediate terminal C and impedance element 23a; and transformer 33 has its primary winding 33a connected across terminals C and A with secondary winding 33b connected intermediate terminal C and variable impedance 23b. Each transformer is thus essentially connected as an autotransformer with the polarity connections indicated thereon resulting in relative current flow in the directions pictured in FIG. 1.

In view of the so defined interconnections with the input terminals and the fact that the compensation network 10 essentially provides a closed loop system with the motor 1, it has been found that once the impedance (and particularly the reactance) of the network 10 is initially adjusted to null the negative sequence currents in the lines A', B', and C', subsequent voltage magnitude and phase imbalances within the range normally encountered during the motor operation will result in, at most, only small, and therefore acceptable, increases in the negative sequence currents above such nulled value.

The initial adjustment of the network 10 is effected by adjusting the a-c impedance of the loops 20 and 21 until the negative sequence currents in the respective lines A', B', and C', are minimized or nulled. Such adjustment can be effected by measuring the negative sequence currents in the lines and varying the impedance of elements 22a, 22b, 23a, and 23b until these negative sequence currents reach a minimum value. This initial calibration or adjustment will therefore essentially set the network 10 to compensate for unsymmetrical circuit conditions occuring at the time, including those attributable to unequal impedances, winding variations, etc. in the motor itself. Thereafter, any subsequently occurring dissymmetries in the overall system (resulting from transient or operating fluctuations, for example) within the range normally encountered during motor operation will be tracked by the network 10, principally within the closed loops 20 and 21, so that the negative sequence current will remain at such nulled value or, at most, varying minimally above this nulled condition.

Various means presently known in the art may be employed, during the intial nulling caibration, for measuring the respective negative sequence currents in the lines A', B', and C', one type of such apparatus presently being marketed by Esco Manufacturing Company of Greenville, Tex. Another type is the bridge meter disclosed in the text *Symmetrical Components*, Wagner and Evans, McGraw-Hill Book Co., 1933, pp. 286–288.

Figure 2:
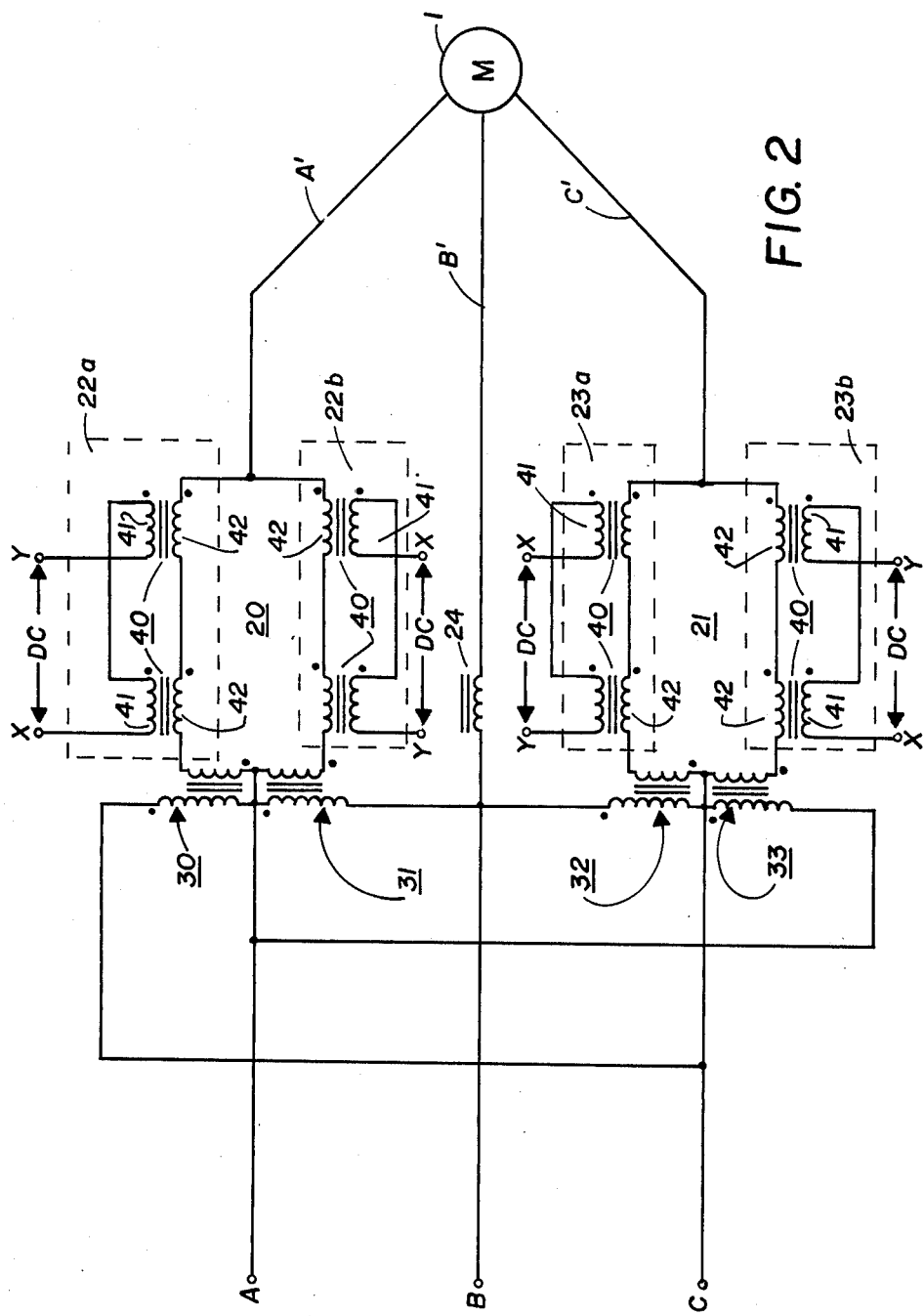
FIG. 2 is a detailed schematic of a preferred form of the negative sequence compensation network illustrated in FIG. 1.

Referring now to FIG. 2, there is described a preferred embodiment of the negative sequence compensation network 10 depicted in FIG. 1. Accordingly, the impedance element 24, normally of a fixed impedance, may be provided by one winding of a conventional iron core transformer. Additionally, each of the variable impedance elements 22a, 22b, 23a, and 23b are, in the preferred embodiment, provided by a pair of torroidal core transformers 40 connected in the manner, and with the polarity, depicted in FIG. 2. Thus, as may be evident to one skilled in the art, each variable impedance element is, in essence, a saturable reactor; the windings 41 constituting the d-c control windings, and the windings 42 (which are interconnected in the respective branches of the loops 20 and 21) constituting the load windings. Thus, by varying the d-c voltage across the terminals X and Y, the a-c impedance of each branch of the closed loops 20 and 21 may be adjusted.

Figure 3:
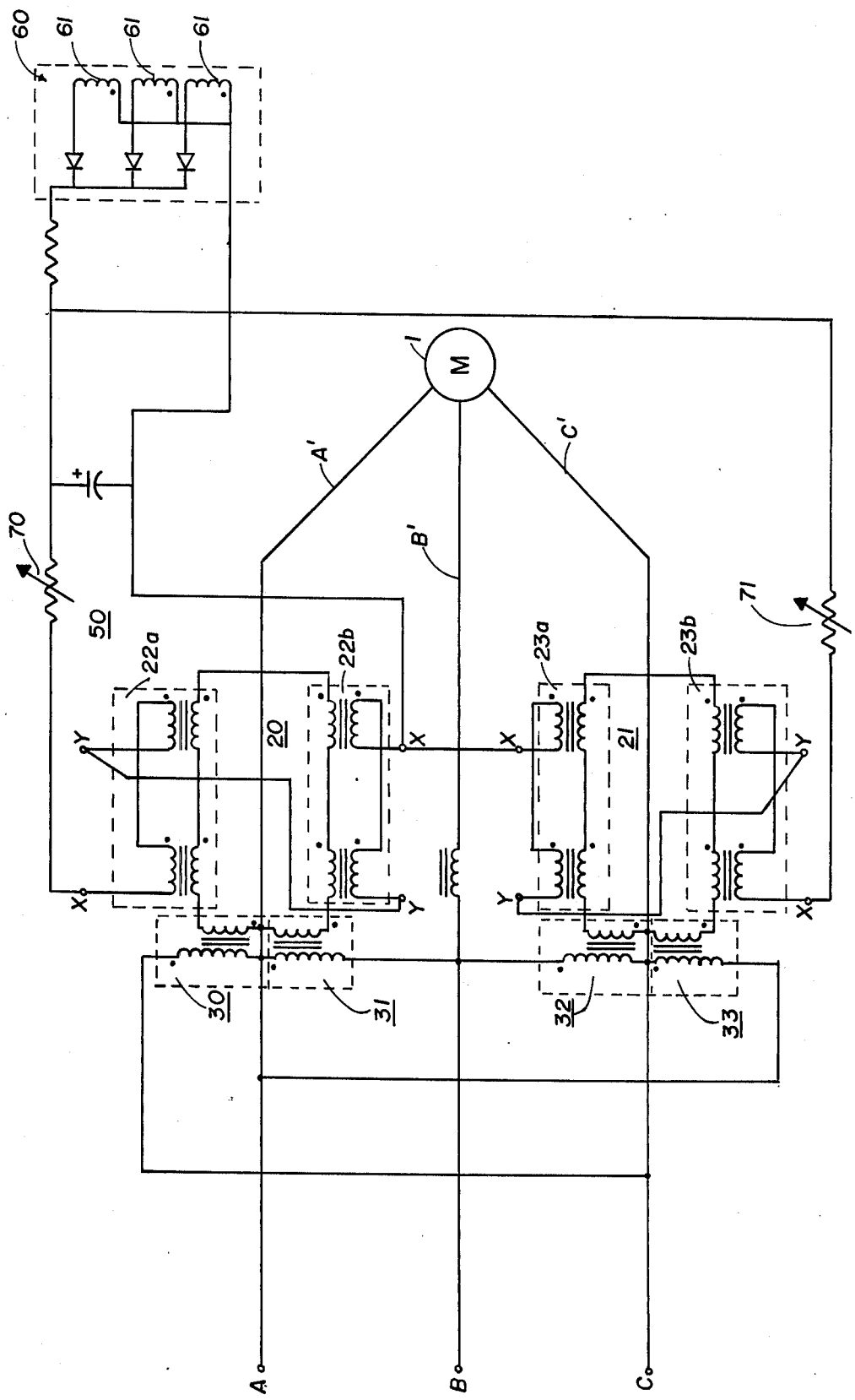
FIG. 3 is a schematic illustration similar to FIG. 2 depicting means for varying the impedance of the negative sequence compensation network.

A control network for adjusting the value of the d-c voltages applied to the control windings of the saturable reactors is depicted in FIG. 3. Accordingly, for convenience, the Y input terminals of the set of saturable reactors in each loop (22a and 22b; 23a and 23b) are interconnected; and a variable d-c voltage from the output of a control network 50 supplied across the X input terminals of each set. The d-c voltage is derived from the output of a full wave rectifier network 60, the windings 61 being respectively inductively coupled with the primary windings 30a, 31a, etc.) across the line inputs (A, B, C).

The high side of the network 50 is respectively coupled by way of rheostats 70 and 71 to the input terminals X of the variable impedance means (saturable reactors) 22a and 23b, while the low side thereof is connected to the input terminals X of the variable impedance means 22b and 23a. Thus, as may be apparent, the a-c impedance of the loop 20 is varied by varying the rheostat 70; while the impedance of the loop 21 is changed by varying the rheostat 71. Alternatively, if desired, the voltage across the control windings of each of the four saturable reactors may be independently adjusted.

The initial calibration or setting of the compensation network 10 is effected by adjusting each of the rheostats 70 and 71 until the negative sequence currents in the lines A', B', and C' being measured reach a minimum value or are nulled. Thereafter, the compensation network 10, due to its tracking, will be effective to maintain these negative sequence currents at or near such minimum value.

It is noted that the input terminal B actually acts as a reference terminal with the compensation principally being carried out in the A and C lines. For effective compensation, the transformers 30 – 33 should be of essentially the same construction and turns ratio.

Figure 4:
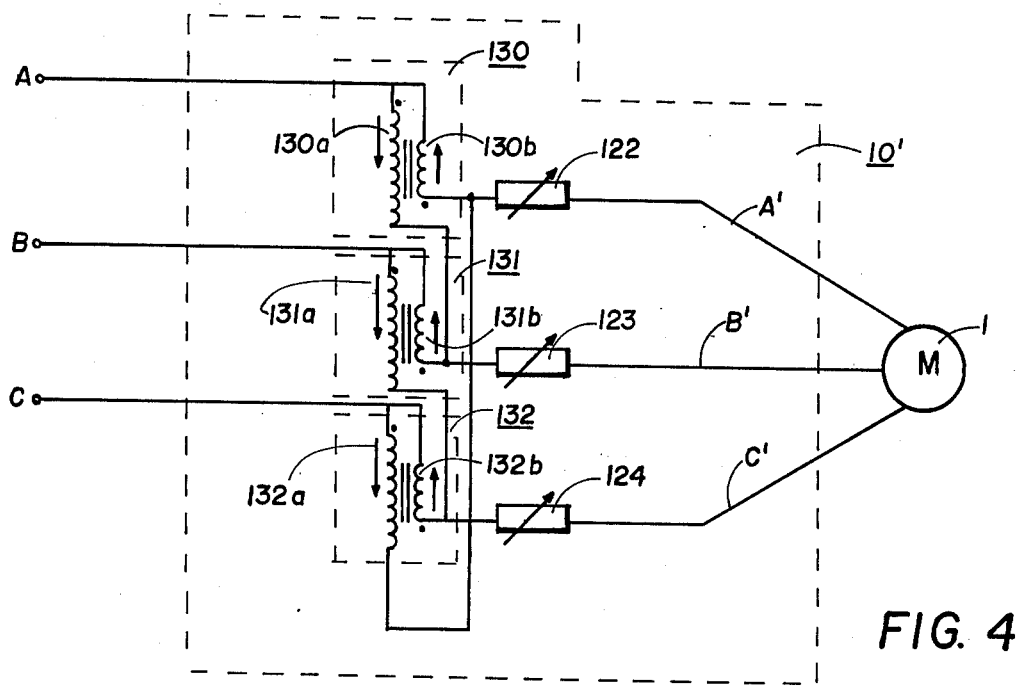
FIG. 4 is a schematic drawing, partially in block diagram form, illustrating the negative sequence compensation network in accordance with another preferred embodiment of the invention, and showing its interconnection with a polyphase motor.

Referring now to FIG. 4, an alternate preferred embodiment of the compensation network (for comparison, now designate 10') is depicted. As previously described, the compensation network 10' is connected adjacent the motor 1 between the input terminals A, B, and C and the motor leads A', B', and C'. In this embodiment, variable impedance elements 122, 123, and 124 are respectively disposed in each of the motor lines A', B', and C' and connected with the transformers 130 – 132.

As illustrated in FIG. 4, each of the potential transformers 130 – 132 have their respective secondary windings (130b, 131b, and 132b) electrically connected with the primary windings as well as the respective variable impedance elements. Additionally, each of the primary windings are connected between the input of one phase and the secondary output of another phase. Thus, primary winding 130a is connected between input terminal A and the output of secondary winding 131b; primary winding 131a is connected between input terminal B and the output of secondary winding 132b; and primary winding 132a is connected between input terminal C and the output of secondary winding 130b. The windings of each of the transformers have the polarity as indicated in FIG. 4, thus resulting in the relative current flow depicted therein.

Figure 5:
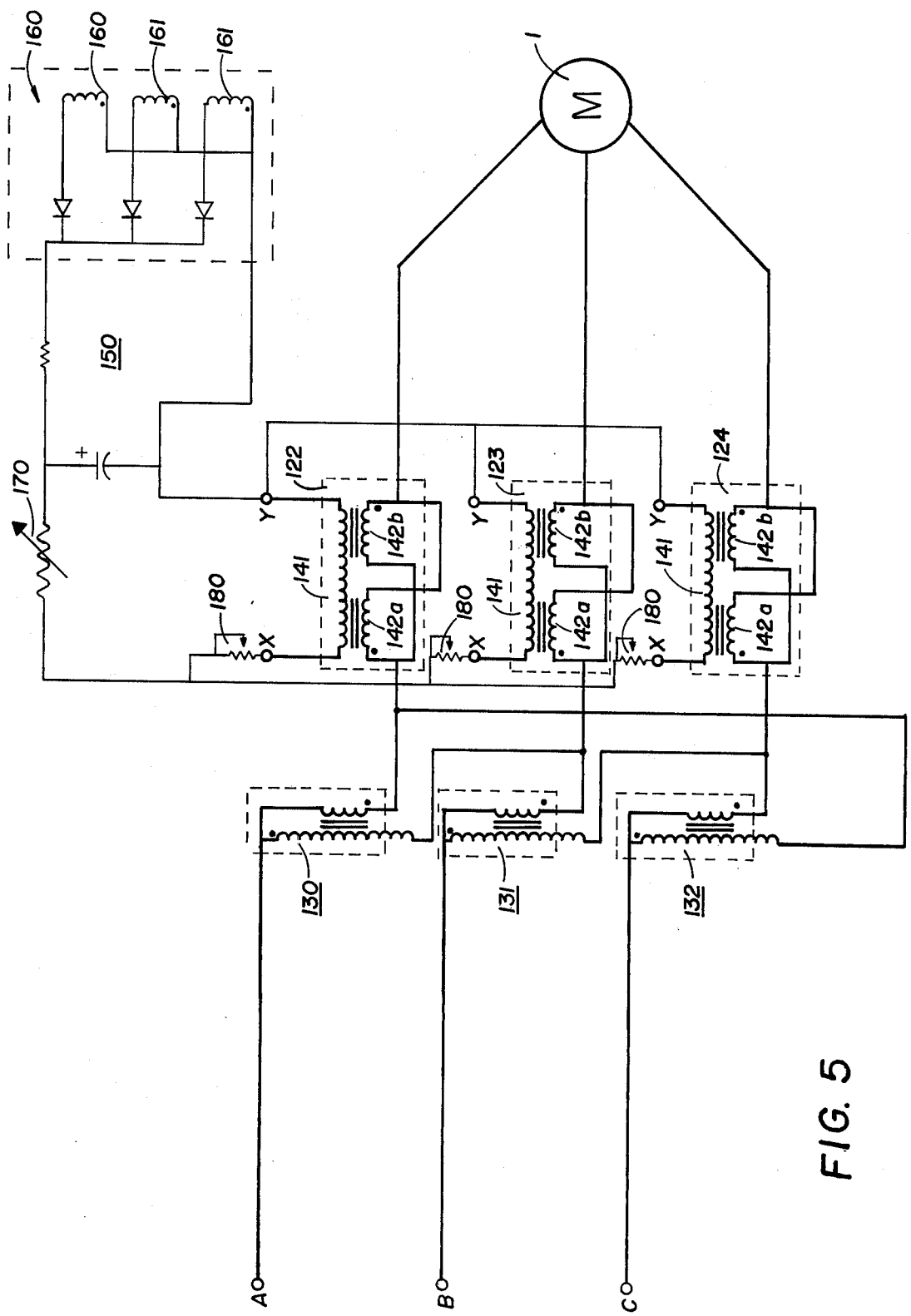
FIG. 5 is a detailed schematic of a preferred form of the compensation network illustrated in FIG. 4, also showing the means for varying its impedance.

Referring now to FIG. 5, there is described a preferred form of the negative sequence compensation network 10' depicted in FIG. 4. Accordingly, each of the variable impedance elements 122, 123, and 124 is provided by a saturable reactor comprising a d-c control winding 141 and parallel connected load windings 142a and 142b, each of the load windings being wound with the polarity as indicated in FIG. 5. In the manner similar to that previously described, by varying the d-c voltage across the terminals X and Y of the control windings 141, the a-c impedance of the load windings 142a and 142b (and thus the impedance of elements 122 – 124) can be adjusted.

The control network 150 for adjusting the value of the d-c voltage applied to the respective control windings of the saturable reactors is similar to that previously described with respect to FIG. 3; but in this embodiment, only one rheostat is required to effect such adjustment. Accordingly, the d-c voltage is derived from the output of the full wave rectifier network 160, the windings 161 thereof being respectively inductively coupled with the primary windings of the potential transformers 130 – 132. The high side of the control network 150 is connected by way of rheostat 170 to each of the d-c control terminals X of the saturable reactors 122 – 124, while the low side thereof is connected to the terminals Y of these control windings. Thus, as before, the voltage applied to the d-c control windings (and thus the overall a-c impedance of the elements 122 – 124) is varied by varying the rheostat 170. If desired, slide wire adjustable resistors 180 may be provided between the rheostat 170 and each of the input terminals X of the d-c control windings to enable initial factory calibration of the control network 150.

The adjustment and operation of the compensation network 10' is similar to that previously described. Accordingly, the rheostat 170 is adjusted until the negative sequence currents in the lines A', B', and C' are eliminated or nulled. Thereafter, the compensation network 10', due to its tracking, will be effective to maintain these negative sequence currents at or near such nulled value during the motor operation and for unbalanced circuit conditions normally encountered during such operation.

Various modifications to the disclosed embodiments, as well as alternate embodiments, of the present invention may become apparent to one skilled in the art without departing from the spirit and scope of the invention as defined by the appended claims.

What is claimed is:
1. In a system for supplying power by way of supply lines to a load from a polyphase voltage source, compensation apparatus for reducing or eliminating negative sequence currents in said load, said compensation apparatus comprising:
   a. network means comprising at least first and second closed loops respectively disposed in two of said supply lines, each of said closed loops having parallel branches with a saturable reactor variable impedance element disposed in each of said parallel branches,
   b. transformer means coupled between said polyphase voltage source and said network means, said transformer means comprising a plurality of potential transformers having respective primary windings connected across the input terminals of said three phase voltage source and secondary windings respectively electrically interconnected with the said primary windings as well as with the saturable reactors in each of said parallel branches, and
   c. control means for adjusting the impedance of each of said variable impedance elements to null the negative sequence currents flowing in said load.

2. The compensation apparatus as defined by claim 1 wherein each of said saturable reactors comprises a pair of electrically interconnected load windings disposed in said parallel branch, d-c control winding means inductively coupled to said load windings, and means for varying the d-c voltage across said control winding means.

3. Negative sequence compensation apparatus for minimizing negative sequence currents flowing in a load which is supplied electrical power by way of supply lines from a three phase voltage source, said apparatus comprising:
   a. first, second, and third sets of potential transformers, each of said sets of potential transformers comprising primary and secondary windings respectively inductively coupled with one another; and
   b. first, second, and third variable impedance elements, the respective outputs of which are connected to the said supply lines;
   c. each of said potential transformer sets having one end of its primary winding electrically connected with the input end of its secondary winding as well as with a respective input terminal of said three phase voltage source, the opposed end of said primary winding being electrically connected with the output of a secondary winding of a different potential transformer set, the output of the secondary windings of each set being respectively electrically connected with the inputs of said variable impedance elements.

4. The apparatus as defined in claim 3 wherein said variable impedance elements are saturable reactors.

5. The apparatus as defined by claim 3 wherein each of said variable impedance elements comprises a saturable reactor comprising of a pair of electrically connected load windings, and inductively coupled d-c control winding, and means for varying the d-c voltage across said control winding.

* * * * *